(No Model.) 2 Sheets—Sheet 1.
J. W. MARTIN.
BALING PRESS.
No. 514,950. Patented Feb. 20, 1894.
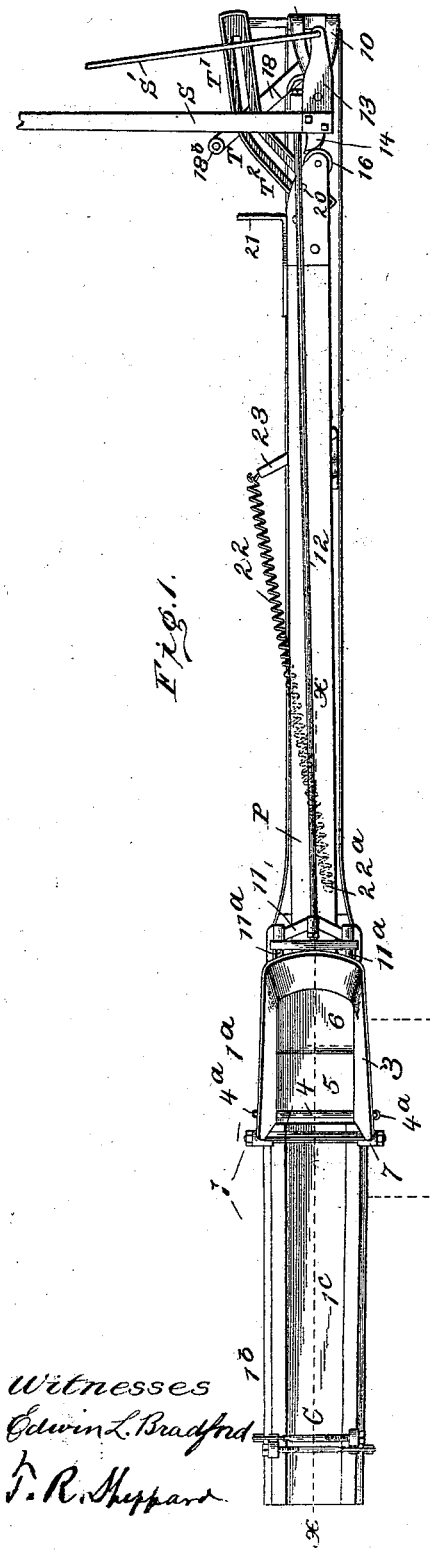
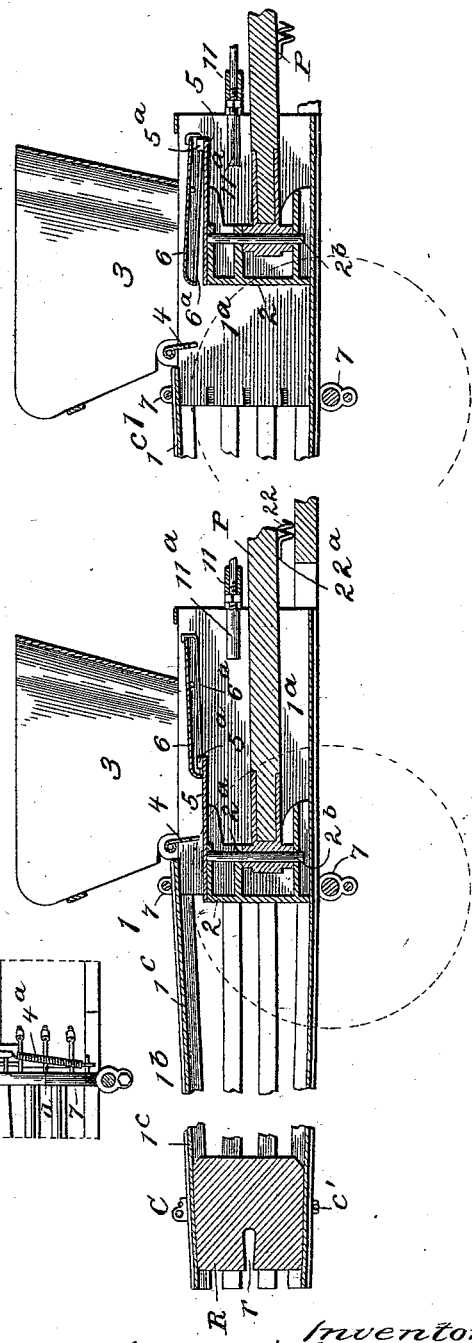
Witnesses
Edwin L. Bradford
J. R. Sheppard
Inventor
James W. Martin
By F. W. Ritter Jr
Attorney (No Model.) 2 Sheets—Sheet 2.

J. W. MARTIN.
BALING PRESS.

No. 514,950. Patented Feb. 20, 1894.

Witnesses
Edwin L. Bradford
T. R. Sheppard

Inventor
James W. Martin
by F. W. Ritter Jr.
Attorney

UNITED STATES PATENT OFFICE.

JAMES W. MARTIN, OF OMAHA, NEBRASKA.

BALING-PRESS.

SPECIFICATION forming part of Letters Patent No. 514,950, dated February 20, 1894.

Application filed January 17, 1893. Serial No. 458,704. (No model.)

*To all whom it may concern:*

Be it known that I, JAMES W. MARTIN, a citizen of the United States, residing at Omaha, in the county of Douglas and State of Nebraska, have invented certain new and useful Improvements in Baling-Presses; and I hereby declare the following to be a full, clear, and exact description of the same, reference being had to the accompanying drawings, in which—

Figure 4:
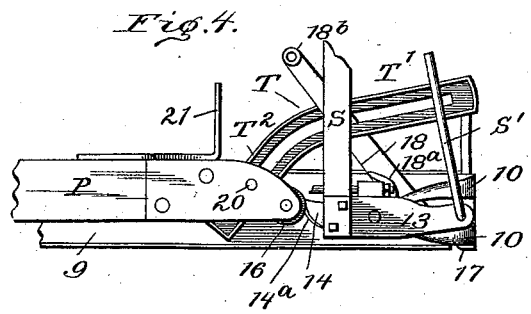
Figure 5:
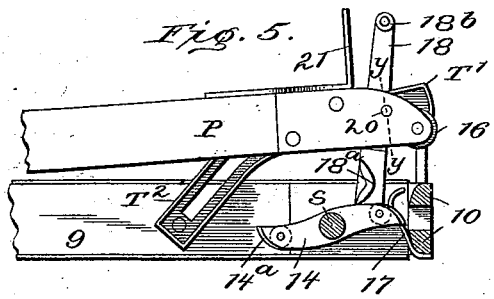
Figure 6:
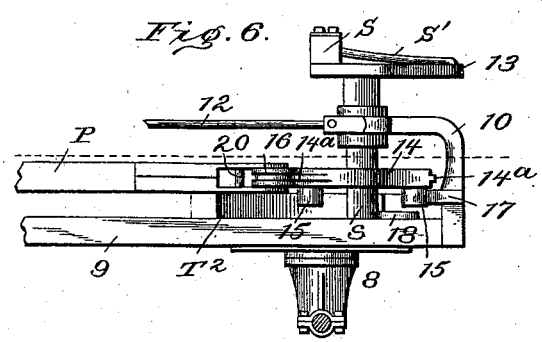
Figure 7:
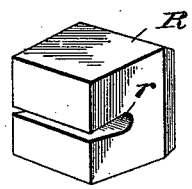
Figure 8:
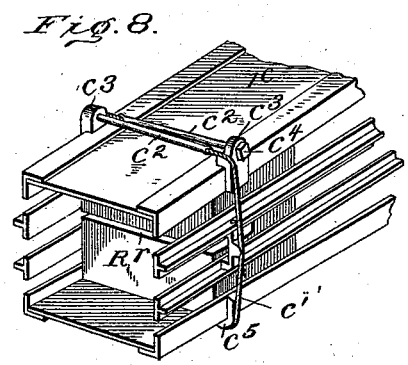
Figure 9:
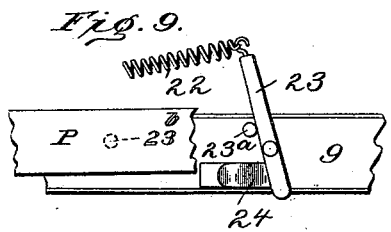
Figure 10:
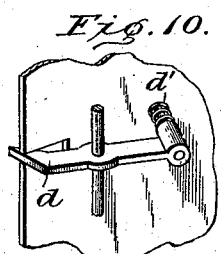
Figure 11:
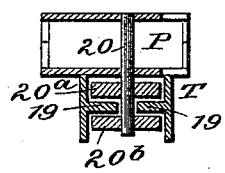

Figure 1, is a plan view of a baling press embodying my invention, the sweep being in the position it occupies just before the release and rebound of the plunger. Fig. 1$^A$ is a projected side view of the hopper and baling chamber. Fig. 2 is an enlarged detail sectional view on the line $x$—$x$, Fig. 1, showing the baling and tying chamber, the hopper slide and the plunger in its advanced position, as shown in Fig. 1. Fig. 3 is a similar section showing the plunger partially withdrawn and at the point where it engages the hopper slide to withdraw the same. Fig. 4 is an enlarged plan view of the end of the pitman, the track therefor, and a part of the sweep, the parts being in the position shown in Fig. 1, that is to say, the plunger fully advanced. Fig. 5 is a similar view, the parts being in the position they occupy after the rebound of the plunger and pitman and just before the roller on the under side of the cam lever engages the lever which gives the primary or initial movement to the pitman. Fig. 6 is an enlarged view of the cam lever and the end of the pitman, showing the groove in the anti-friction roller of the pitman and the tongue on the cam lever. Fig. 7, is a detached view of the resistance block used in the baling chamber. Fig. 8 is a detached view of the adjustable clamp used around the end of the tying chamber. Fig. 9 is an enlarged view of portions of the reach, the pitman and the spring which actuates and controls the pitman showing the relative arrangement and connection of said parts. Fig. 10, is an enlarged detail view of the dogs on the sides of the plunger chamber which prevent the expansion of the compressed material. Fig. 11 is a cross section of track T, on the line $y$—$y$, Fig. 5.

Like symbols refer to like parts wherever they occur.

My invention relates to the construction of baling presses, adapted for baling hay, straw, cotton, and like material, and while, for purposes of illustration, the improvements hereinafter described, are shown in connection with portable, rebounding-plunger, presses, it is not my intention to limit the invention thereto, as certain features will be found of great utility in baling presses in general.

The first object I have in view is to check and control the rebound of the plunger; and this I effect by means of a spring or its equivalent, so combined with the pitman as to first actuate, and then resist the travel, of the pitman, which combination, or its equivalent embodies the first feature of my invention.

A second object I have in view, is such a construction of the track in which the end of the pitman travels as shall properly present the end of the pitman to the cam levers which actuate the pitman, and shall also facilitate the clearance of the pitman on the rebound of the plunger, and such a construction embodies a second feature of my invention.

There are other, minor features of invention, all as will hereinafter fully appear.

I will now proceed to describe my invention more fully so that others skilled in the art to which it appertains, may apply the same.

In the drawings, 1, indicates the baling and tying chamber, the end 1$^a$, of which, wherein the plunger 2, moves, is in the form of a closed box, surmounted by a hopper 3, while the distant or tying end of the chamber, indicated by 1$^b$, has slatted sides and spring board top 1$^c$, or is constructed in some equivalent manner which will allow it to yield or be narrowed by the operation of the adjustable clamp mechanism C, to confine the friction or resistance block R, commonly employed within the tying chamber.

R, indicates the resistance block, adapted to be used within the baling chamber, which block is preferably slightly tapering in form and recessed as at $r$, to permit it to yield and be clamped by the walls of the tying chamber.

C, indicates an adjustable clamp or binder, which is usually applied near the extreme end of the tying chamber and which consists of a flexible section $c'$ having at its ends threaded rod sections $c^2$, which pass through perforated lugs or ear pieces $c^3$, arranged on the tying chamber and are provided with nuts $c^4$, by means of which the band may be tightened up or loosened as required.

In order to protect the flexible section $c'$ of the clamp C and facilitate the tightening up of the clamp, grooved corner pieces $c^5$, &c., may be employed, and the perforated lugs or ear pieces $c^3$, may also be grooved for the passage and guidance of the flexible section of the clamping band.

In order to prevent the expansion of the compressed material and its return into the plunger chamber on the recession of the plunger, I arrange at the junction of the plunger chamber $1^a$, and the tying chamber $1^b$, and projecting through the sides of the plunger chamber, a series of pivoted dogs $d$, spring supported by means of spiral springs $d'$ encircling pins which pins move freely through perforations or holes in the tails of the dogs and rest against the sides of the plunger chamber.

In order to avoid binding and friction between the plunger 2, and the hopper (or top of the baling chamber), a considerable space is usually left between the bottom of the hopper 3, and the top of the plunger 2, and this space is guarded by a swinging (preferably serrated) plate or vibrating spring leaf 4, controlled by a spring $4^a$, which plate serves to hold or fold down the surplus material at the top of the baling chamber.

2, indicates the traverser or plunger adapted to travel in the plunger chamber $1^a$, and provided with a cross-head $2^a$ and pivot post $2^b$, on which is pivoted the end of the pitman P. Attached to the upper face of the plunger 2, and extending rearward is a plate 5, and arranged above the same, and to close the bottom of hopper 3 is a slide 6, the parts 5 and 6 being connected by a strap $6^a$, and loop $5^a$, so that the slide 6 shall advance with the plunger 2, during part of its inward (or compressing movement) and recede with the plunger through part of its outward movement (or rebound) so that the plunger in its movements is effectually guarded against interference from the material in the hopper 3.

As before specified, the baling press devised by me is more especially intended to be used as a portable press; I therefore arrange on the baling chamber, 1, adjacent to the plunger chamber, a frame 7 through which passes the rear axle, and beneath the sweep-post $s$, I secure a fifth wheel and bolster 8 adapted to rest upon and be secured to the front axle. The plunger chamber $1^a$, and the sweep post $s$ (or the front and rear axles) are connected by a reach 9, securely attached at one end to the plunger chamber and at its opposite end provided with a goose neck or bracket 10 which forms the upper bearing of sweep post $s$. The upper end of the goose neck or bracket 10 is connected with a cross head 11, attached to the plunger chamber by means of an adjustable rod connection 12, so that a structure of great strength is obtained; and said cross-head 11 is provided with bumper posts $11^a$, $11^a$ for the plunger 2.

$s$ indicates the sweep post stepped below on the reach 9, journaled above in the bracket or goose neck 10, and provided at its upper end with a cross piece 13 to which the sweep S is attached and from which it is braced by a rod connection $S'$.

Secured to the sweep post $s$, at a suitable distance above reach 9, is the cam lever 14, its outer ends rounded off to coact with the end of the pitman P and provided with a rib or tongue $14^a$, adapted to engage in a groove in the periphery of the anti-friction roller 16, with which the end of pitman P is provided.

On the under surface of cam lever 14, are antifriction rollers 15, adapted to engage with a spring 17 (secured to the bracket 10, or other suitable support), whenever the opposite end of the cam lever 14 escapes from pitman P, and thus effectually counteract any recoil of the sweep (so galling to the team) whenever the load is temporarily removed from the sweep. These rollers 15 also engage a cam surface $18^a$, on a lever 18 pivoted on the reach near the foot of the sweep post $s$, and through said lever or arm 18 cause the initial movement of the end of the pitman P, whereby it is brought within the reach of the short cam lever 14, which does the heavy work of compression.

T, indicates a track for the guidance of the end of pitman P. This track which is preferably supported from or on the reach 9, is of irregular form composed of two sections. Of these the section $T'$ is the longest and is gently inclined toward the line of applied power so as to permit the gradual advance of the plunger 2 (or the initial movement of the pitman), while the other section $T^2$ is abruptly inclined to the line of applied power so as to apply the full power to the plunger 2 on the last part of its advance. The track T is preferably provided with a slotted central web 19, (or inwardly projecting ribs, see Fig. 11,) through which passes a journal post 20, dependent from pitman P, and on said journal post 20 are two anti-friction rollers $20^a$, $20^b$, one on each side of the slotted web 19, whereby the end of the pitman P is held down as well as guided. Projecting laterally from pitman P, is a bar or fixed arm 21, with which engages an anti-friction roller $18^b$, on the pivoted lever 18, which imparts the initial movement to pitman P to carry its end and grooved roller 16 within reach of cam lever 14 on sweep post $s$.

The rebound of the plunger is effected by means of a spring 22, secured to the pitman P, as at $22^a$, (see Fig. 1,) but the opposite end of said spring 22 instead of being connected directly to the reach 9 (or other fixed point) is secured to a pivoted lever 23 (see Fig. 9) which lever is limited in its movement in one direction by a fixed stop $23^a$, and is moved in the opposite direction by a pin $23^b$ on the under side of the pitman—consequently while the contraction of spring 22 causes the rebound of the pitman P, it follows that as soon as pin 23$^b$, on the under side of the pitman P strikes pivoted lever 23, the draft is brought directly on the spring 22 which now acts to retard and control the rebound of the pitman and plunger.

24, indicates a brake spring arranged to bear upon pivoted lever 23, to steady and control its motion.

The operation of a press constructed substantially as hereinbefore specified, will be as follows:—The pitman P, sweep S and cam lever 14, being in the relative position shown in Fig. 4, the roller 15 on the under side of cam lever 14, engages cam surface 18$^a$, on pivoted lever 18 and moves said lever so that the roller 18$^b$, of lever 18 engages bar 21, on pitman P and forces the pitman along section T' of track T until the end of pitman P and its grooved roller 16 is brought within reach of and engaged by the end of cam lever 14 which forces the end of the pitman P along the second section T$^2$ of track T, completing the throw or advance of the plunger 2, and the compressing operation. During this movement of pitman P the spring 22 has been elongated and the pivoted lever 23, to which it is attached, has been brought forward until arrested by stop 23$^a$; when, therefore, one end of cam lever 14 escapes from pitman P, its opposite end will engage spring 17 on bracket 10, which will prevent the recoil of the sweep S, and at the same time the contraction of spring 22 will cause the rebound of pitman P and plunger 2. The pitman on its rebound will bring the pin 23$^b$ on its under surface in contact with lever 23, which will at once put spring 22 under extension and cause it to resist and control the further rebound of the pitman. During the latter part of the advance of plunger 2, it will carry with it beneath the hopper 3, the slide 6, and said slide will retain the position into which it is thus carried during the first part of the return travel or recession of the plunger so as to effectually guard the rear of the plunger from the interference of any material contained in hopper 3. During the latter half of the reverse movement of plunger 2 and pitman P, the slide 6 will be completely withdrawn from beneath the hopper so as to open the baling or plunger chamber 1$^a$. As the cam lever 14 has two arms, it is evident that the pitman and plunger will advance and recede twice for every revolution of the sweep—and it is equally evident that if desired, the number of movements of the pitman and plunger can be multiplied by multiplying the cam levers 14.

Having thus described my invention, what I claim, and desire to secure by Letters Patent, is—

1. In a rebounding plunger press, the combination with the plunger pitman, of a spring attached thereto, a movable support to which said spring is also secured, and means whereby the pitman engages said movable support during part of the rebound movement; substantially as and for the purposes specified.

2. In a rebounding plunger press, the combination with the plunger pitman, of a spring attached thereto, a pivoted lever to which the spring is also attached, and means for limiting the movement of the pivoted lever; substantially as and for the purposes specified.

3. In a rebounding plunger press, the combination with the plunger pitman, of a spring attached thereto at one end, a pivoted lever to which the opposite end of said spring is attached, and a projection on the pitman which engages said pivoted lever; substantially as and for the purposes specified.

4. In a rebounding plunger press, the combination with the plunger pitman, of a spring attached thereto, a pivoted lever to which said spring is also attached, a stop to limit the movement of the pivoted lever, and a projection on the pitman to engage the pivoted lever; substantially as and for the purposes specified.

5. In a rebounding plunger press, the combination with the plunger pitman, of a spring attached thereto, a pivoted lever with which said spring is also connected, and a brake spring which acts on the pivoted lever; substantially as and for the purposes specified.

6. In a baling press, the combination with a pitman, of a sweep post provided with a cam lever 14, and a spring 17 arranged opposite the pitman and in the path of the cam lever; substantially as and for the purposes specified.

7. In a baling press, the combination with the outer end of the pitman having a journal post provided with anti-friction rollers, of the track having the slotted central web and composed of the two sections, one having a gradual inclination and the other an abrupt inclination to the line of force, and means for actuating said pitman; substantially as and for the purposes specified.

8. In a baling press, the combination with the pitman, of a pitman track, composed of two sections the first of which has a gradual and the second an abrupt inclination to the line of force, a pivoted lever, for causing the travel of the pitman on the first section, mechanism for operating said pivoted lever and a cam lever for causing the travel of the pitman on the second section of the track; substantially as and for the purposes specified.

9. In a baling press, the combination with a pitman and suitable track for the end thereof, of a sweep post having a cam-lever, and a pivoted lever arranged in the path of cam-lever and pitman, whereby the pivoted lever is acted on by the cam lever and actuates the pitman in advance of the engagement of the cam lever with the pitman; substantially as and for the purposes specified.

10. In a baling press, the combination with a pitman and suitable track therefor, of a sweep post having a cam lever, a roller on one face of the cam lever, a pivoted lever having a cam surface for the roller on the cam lever, and a roller to engage a bar or arm on the pitman, and a bar or arm on the pitman with which the roller of the pivoted lever engages; substantially as and for the purposes specified.

11. In a baling press, the combination with a yielding slatted tying chamber, of a tapering recessed resistance block, and an adjustable clamp or binder having threaded rod sections and an intermediate flexible section; substantially as and for the purposes specified.

12. In a baling press, the combination with a yielding slatted tying chamber, and a compressible resistance block therefor, of grooved corner pieces, perforated lugs or ear pieces, and a flexible binder having rod ends which pass through the perforations of said lugs or ear pieces; substantially as and for the purposes specified.

In testimony whereof I affix my signature, in presence of two witnesses, this 7th day of January, 1893.

JAMES W. MARTIN.

Witnesses:
  MAE C. WOOD,
  W. N. WILLIAMS.